(12) United States Patent
Jaber et al.

(10) Patent No.: US 6,277,931 B1
(45) Date of Patent: Aug. 21, 2001

(54) DUAL REACTOR ETHYLENE POLYMERIZATION PROCESS

(75) Inventors: Isam Jaber; Stephen John Brown, both of Calgary (CA)

(73) Assignee: Nova Chemical (International) S.A. (CH)

(*) Notice: Subject to any disclaimer, the term of this patent is extended or adjusted under 35 U.S.C. 154(b) by 0 days.

(21) Appl. No.: 09/386,098

(22) Filed: Aug. 30, 1999

(30) Foreign Application Priority Data

Sep. 22, 1998 (CA) .................................. 2247703

(51) Int. Cl.[7] .................................. C08F 2/01; C08F 4/16
(52) U.S. Cl. ..................... 526/65; 526/116; 526/119; 526/133; 526/161; 526/352; 502/155
(58) Field of Search ................. 526/160, 161, 526/65, 170, 127, 129, 134, 66, 116, 119, 133, 352; 502/103, 117, 154, 155; 525/247, 240, 242, 244, 245

(56) References Cited

U.S. PATENT DOCUMENTS

| | | |
|---|---|---|
| 4,530,914 | 7/1985 | Ewen et al. . |
| 4,701,432 | 10/1987 | Welborn, Jr. . |
| 5,132,380 | 7/1992 | Stevens et al. . |
| 5,198,401 | 3/1993 | Turner et al. . |
| 5,434,116 | 7/1995 | Sone et al. . |
| 5,554,775 | 9/1996 | Krishnamurti et al. . |
| 5,589,555 | 12/1996 | Zboril et al. . |
| 5,637,659 | 6/1997 | Krishnamurti et al. . |
| 5,965,677 * | 10/1999 | Stephen et al. ............. 526/129 |
| 6,063,879 * | 5/2000 | Stephan et al. ............. 526/127 |

* cited by examiner

Primary Examiner—David W. Wu
Assistant Examiner—R. Harlan
(74) Attorney, Agent, or Firm—Kenneth H. Johnson

(57) ABSTRACT

A dual reactor process for the solution and (co) polymerization of ethylene uses two different types of catalysts in the two reactors. A catalyst having a phosphinimine ligand is used in the first reactor. A Ziegler Natta catalyst is used in the second reactor. The process of this invention is comparatively easy to control and may be used to produce polyethylene products having a broad molecular weight distribution. Linear low density produced according to this invention is well suited for the manufacture of molded goods and plastic films.

7 Claims, No Drawings

DUAL REACTOR ETHYLENE POLYMERIZATION PROCESS

FIELD OF THE INVENTION

This invention relates to the solution polymerization of ethylene in two reactors using two different catalyst systems.

BACKGROUND OF THE INVENTION

The use of so-called "single-site" catalysts such as metallocene catalysts to prepare polyethylene having a narrow molecular weight distribution is well known. The "linear low density polyethylene" (or "LLDPE", a copolymer of ethylene and a higher alpha olefin) prepared with such catalysts typically exhibits a very uniform composition distribution (i.e. the comonomer is very uniformly distributed within the polymer chains). The combination of narrow molecular weight distribution and uniform composition distribution distinguishes these polymers from "conventional" LLDPE which is commercially manufactured with a Ziegler Natta catalyst or a chromium catalyst. In particular, the conventional LLDPE products have a broader molecular weight distribution and a broader composition distribution. These compositional differences are manifested in the form of differences in the physical properties of the two types of LLDPE polymers. Most notably, LLDPE prepared with a single site catalyst has improved impact strength and optical properties in comparison to "conventional" LLDPE. However, one advantage of the "conventional" LLDPE is that it is usually easier to "process" in its existing mixers and extruders. Accordingly, it would be highly desirable to prepare LLDPE products which possess the improved physical properties offered by single site catalysts and retain the broad molecular weight distribution (for improved processability) which is associated with conventional LLDPE.

One approach which has been used to achieve this object is the use of mixed catalyst systems. For example, U.S. Pat. No. (USP) 4,530,914 (Ewen et al, to Exxon) teaches the use of two different metallocenes and U.S. Pat. No. 4,701,432 (Welborn, to Exxon) teaches the use of a supported catalyst prepared with a metallocene catalyst and a Ziegler Natta catalyst. Many others have subsequently attempted to use similar mixed catalyst systems as may be quickly ascertained by reviewing the patent literature.

However, the use of "mixed" catalyst systems is often associated with operability problems. For example, the use of two catalysts on a single support (as taught by Welborn in U.S. Pat. No. 4,701,432) may be associated with a reduced degree of process control flexibility (e.g. If the polymerization reaction is not proceeding as desired when using such a catalyst system, it is difficult to establish which corrective action should be taken as the corrective action will typically have a different effect on each of the two different catalyst components). Moreover, the two different catalyst/cocatalyst systems may interfere with one another—for example, the organoaluminum component which is often used in Ziegler Natta or chromium catalyst systems may "poison" a metallocene catalyst. Accordingly, a "mixed catalyst" process which mitigates some of these difficulties would be a useful addition to the art.

SUMMARY OF THE INVENTION

The present invention provides a medium pressure solution polymerization process characterized by:

A) polymerizing ethylene, optionally with one or more $C_{3-12}$ alpha olefins, in solvent in a first polymerization reactor at a temperature of from 80 to 200° C. and a pressure of from 500 to 8,000 pounds per square inch gauge ("psi") in the presence of (a) a first catalyst which is an organometallic complex of a group 4 or 5 metal that is characterized by having at least one phosphinimine ligand; and (b) a first cocatalyst; and B) passing said first polymer solution into a second polymerization reactor and polymerizing ethylene, optionally with one or more $C_{3-12}$ alpha olefins, in said second stirred polymerization reactor at a higher polymerization temperature than that of said first reactor in the presence of a Ziegler Natta catalyst, wherein said Ziegler Natta catalyst comprises a transition metal compound of a transition metal selected from groups 3, 4 or 5 of the Periodic Table (using IUPAC nomenclature) and an organoaluminum component which is defined by the formula:

$$Al(X')_a(OR)_b(R)_c$$

wherein: X' is a halide (preferably chlorine); OR is an alkoxy or aryloxy group; R is a hydrocarbyl (preferably an alkyl having from 1 to 10 carbon atoms); and a, b, or c are each 0, 1, 2 or 3 with the provisos that a+b+c=3 and b+c≧1.

Thus, the process of the present invention requires two solution polymerization reactors and two distinct catalyst systems. The first catalyst must have a phosphinimine ligand (and, hence, is sometimes referred to herein as a "phosphinimine catalyst" or "PIC").

The first reactor uses the "phosphinimine catalyst". Conventional process control techniques may be used to operate the first reactor as there is only one catalyst to deal with.

Preferred phosphinimine catalysts for use in the first reactor are titanium species which contain one cyclopentadienyl ligand, one phosphinimine ligand and two chloride ligands.

It is particularly preferred that the concentration of titanium in the first reactor be less that 1 part per million (ppm) especially less that 0.5 ppm (based on the weight of titanium divided by the weight of the reactor contents).

Exemplary cocatalysts for the phosphinimine catalyst are alumoxanes and/or ionic activators. Preferred cocatalysts for the phosphinimine catalyst are a combination of:

1) an alumoxane (in which the Al/Ti molar ratio, based on the alumoxane and the titanium in the phosphinimine catalyst is between 10/1 and 200/1, most preferably from 40/1 to 120/1); and 2) a boron-containing ionic activator (in which the B/Ti ratio, based on the boron in the ionic activator to the titanium in the phosphinimine catalyst is between 0.5/1 and 1.5/1).

The polymer solution from the first reactor is transferred to the second solution polymerization reactor. A Ziegler Natta catalyst is used in the second reactor. It is preferred that the Ziegler Natta catalyst contains at least one transition metal selected from titanium and vanadium, and that the molar concentration of titanium/vanadium which is added to the second reactor is at least 10 times greater than the titanium concentration in the first reactor.

Thus, the second polymerization reactor must use a Ziegler Natta catalyst. Additionally, the second polymerization reactor must be operated at a higher temperature from the first—most preferably, at least 30° C. higher than the first.

While not wishing to be bound by any particular theory, it is believed that the reactor conditions in the second reactor "overwhelm" the catalyst from the first reactor (i.e. for process control purposes, any residual catalyst from the first reactor is not a concern in the second reactor). This is desirable from a process operability perspective as it reduces the number of variables which need to be considered when controlling the polymerization reaction in the second reactor.

DETAILED DESCRIPTION OF PREFERRED EMBODIMENTS

Part 1. Description of First Catalysts

The catalyst used in the first reactor of the process of this invention ("first catalyst") is an organometallic complex of a group 4 or 5 metal which is characterized by having at least one phosphinimine ligand (where the term phosphinimine is defined in section 1.2 below).

Any such organometallic having a phosphinimine ligand which displays catalytic activity for ethylene polymerization may be employed. Preferred first catalysts are defined by the formula:

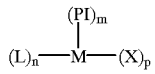

wherein M is a transition metal selected from Ti, Hf and Zr (as described in section 1.1 below); Pl is a phosphinimine ligand (as described in section 1.2 below); L is a monanionic ligand which is a cyclopentadienyl-type ligand or a bulky heteroatom ligand (as described in section 1.3 below); X is an activatable ligand which is most preferably a simple monanionic ligand such as alkyl or a halide (as described in section 1.4 below); m is 1 or 2, n is 0 or 1, and p is fixed by the valence of the metal M.

The most preferred first catalysts are group 4 metal complexes in the highest oxidation state. For example, a preferred catalyst may be a bis (phosphinimine) dichloride complex of titanium, zirconium or hafnium. However, it is particularly preferred that the first catalyst contain one phosphinimine ligand, one "L" ligand (which is most preferably a cyclopentadienyl-type ligand) and two "X" ligands (which are preferably both chloride).

1.1 Metals

The first catalyst is an organometallic complex of a group 4 or 5 metal (where the numbers refer to columns in the Periodic Table of the Elements using IUPAC nomenclature). The preferred metals are from group 4, (especially titanium, hafnium or zirconium) with titanium being most preferred.

1.2 Phosphinimine Ligand

The first catalyst must contain a phosphinimine ligand which is covalently bonded to the metal. This ligand is defined by the formula:

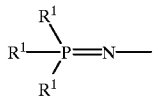

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, and a silyl radical of the formula:

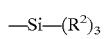

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

1.3 Ligand L

Preferred first catalysts are group 4 organometallic complexes which contain one phosphinimine ligand (as described in section 1.2 above) and one ligand L (as described in sections 1.3.1 to 1.3.6) which is either a cyclopentadienyl-type ligand or a heteroligand.

1.3.1 Cyclopentadienyl-type Ligands

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula $-Si-(R)_3$ wherein each R is independently selected from the group consisting of hydrogen, a $C_{1-8}$ alkyl or alkoxy radical $C_{6-10}$ aryl or aryloxy radicals; germanyl radicals of the formula $Ge-(R^2)_3$ wherein R is as defined directly above.

1.3.2 Heteroligand

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands are described in sections 1.3.2.1 to 1.3.2.6 below.

1.3.2.1 Ketimide Ligands

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b and c are illustrated below:

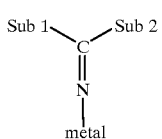

The substituents "Sub 1 and Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

1.3.2.2 Silicone-Containing Heteroligands

These ligands are defined by the formula:

where the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials).

1.3.2.3 Amido Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom.

1.3.2.4 Alkoxy Ligands

The term "alkoxy" is also intended to convey its conventional meaning. Thus, these ligands are characterized by (a) a metal oxygen bond, and (b) the presence of a hydrocarbyl group bonded to the oxygen atom. The hydrocarbyl group may be a ring structure and/or substituted (e.g. 2, 6 di-tertiary butyl phenoxy).

1.3.2.5 Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

1.3.2.6 Phosphole Ligands

The term "phosphole" is also meant to convey its conventional meaning. "Phospholes" are cyclic dienyl structures having four carbon atoms and one phosphorus atom in the closed ring. The simplest phosphole is $C_4Ph_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116.

1.4 Activatable Ligand

The term "activatable ligand" refers to a ligand which may be activated by a cocatalyst, (also referred to as an "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred first catalyst metals are group 4 metals in their highest oxidation state (i.e. 4+) and the preferred activatable ligands are monoanionic (such as a halide—especially chloride or a alkyl—especially methyl). Thus, the preferred first catalyst contains a phosphinimine ligand, a cyclopentadienyl ligand and two chloride (or methyl) ligands bonded to the group 4 metal. In some instances, the metal of the first catalyst component may not be in the highest oxidation state. For example, a titanium (III) component would contain only one activatable ligand.

1.5 Summary Description of Preferred Catalyst

As previously noted, the preferred first catalyst is a group 4 organometallic complex in its highest oxidation state having a phosphinimine ligand, a cyclopentadienyl-type ligand and two activatable ligands. These requirements may be concisely described using the following formula for the preferred catalyst:

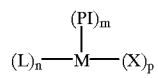

wherein: (a) M is a metal selected from Ti, Hf and Zr; (b) Pl is a phosphinimine ligand defined by the formula:

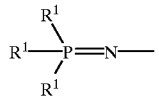

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; (c) L is a ligand selected from the group consisting of cyclopentadienyl, substituted cyclopentadienyl, indenyl, substituted indenyl, fluorenyl, or substituted fluorenyl; and (d) X is an activatable ligand, and wherein: m is 1, n is 1 and p is 2.

2. Description of First Cocatalyst

The catalyst components described in part 1 above are used in combination with at least one cocatalyst (or "activator") to form an active catalyst system for olefin polymerization as described in more detail in sections 2.1, 2.2 and 2.3 below.

2.1 Alumoxanes

The alumoxane may be of the formula:

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

2.2 "Ionic Activators" as Cocatalysts

So-called "ionic activators" are also well known for metallocene catalysts. See, for example, U.S. Pat. No. 5,198, 401 (Hlatky and Turner) and U.S. Pat No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion coordinating anion permits olefin polymerization to proceed at the cationic catalyst center (presumably because the non-coordinating anion is sufficiently labile to be displaced by monomer which coordinate to the catalyst). Preferred ionic activators are boron-containing ionic activators described in (i)–(iii) below:

(i) compounds of the formula $[R^5]^+ [B(R^7)_4]^-$ wherein B is a boron atom, $R^5$ is a aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include:
N,N-dimethylaniliniumtetrakispentafluorophenyl borate;
triphenylmethylium tetrakispentafluorophenyl borate; and
trispentafluorophenyl borane.

3. Description of Ziegler Natta Catalyst

The term "Ziegler Natta catalyst" is well known to those skilled in the art and is used herein to convey its conventional meaning. A Ziegler Natta catalyst must be used in the second (hot) reactor of this invention. Ziegler Natta catalysts comprise at least one transition metal compound of a transition metal selected from groups 3, 4, or 5 of the Periodic Table (using IUPAC nomenclature) and an organoaluminum component which is defined by the formula:

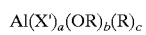

$$Al(X')_a(OR)_b(R)_c$$

wherein: X' is a halide (preferably chlorine); OR is an alkoxy or aryloxy group; R is a hydrocarbyl (preferably an alkyl having from 1 to 10 carbon atoms); and a,b, or c are each 0, 1, 2, or 3 with the provisos text a+b+c=3 and b+c≧1.

It is highly preferred that the transition metal compounds contain at least one of titanium or vanadium. Exemplary titanium compounds include titanium halides (especially titanium chlorides, of which $TiCl_4$ is preferred); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition vanadium oxy trichloride ("$VOCl_3$") is known as a Ziegler Natta catalyst component and is suitable for use in the present invention.

It is especially preferred that the Ziegler Natta catalyst contain both of a titanium and a vanadium compound. The Ti/V mole ratios may be from 10/90 to 90/10, with mole ratios between 50/50 and 20/80 being particularly preferred.

The above defined organoaluminum compound is an essential component of the Ziegler Natta catalyst. The mole ratio of aluminum to transition metal {for example, aluminum/(titanium+vanadium)} is preferably from 1/1 to 100/1, especially from 1.2/1 to 15/1.

As will be appreciated by those skilled in the art of ethylene polymerization, conventional Ziegler Natta catalysts may also incorporate additional components such as an electron donor—for example an amine; or a magnesium compound—for example a magnesium alkyl such as butyl ethyl magnesium and a halide source (which is typically a chloride such as tertiary butyl chloride).

Such components, if employed, may be added to the other catalyst components prior to introduction to the reactor or may be directly added to the reactor.

The Ziegler Natta catalyst may also be "tempered" (i.e. heat treated) prior to being introduced to the reactor (again, using techniques which are well known to those skilled in the art and published in the literature).

4. Description of Dual Reactor Solution Polymerization Process

Solution processes for the (co)polymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methycyclohexane and hydrogenated naphtha. An example of a suitable solvent which is commercially available is "Isopar E" ($C_{8-12}$ aliphatic solvent, Exxon Chemical Co.).

The solution polymerization process of this invention must use at least two polymerization reactors. The first polymerization reactor must operate at a lower temperature ("cold reactor") using a "phosphinimine catalyst" described in Part 1 above.

The polymerization temperature in the first reactor is from about 80° C. to about 180° C. (preferably from about 120° C. to 160° C.) and the hot reactor is preferably operated at a higher temperature (up to about 300° C.). Both reactors are preferably "stirred reactors" (i.e. the reactors are well mixed with a good agitation system). Preferred pressures are from about 500 psi to 8,000 psi. The most preferred reaction process is a "medium pressure process", meaning that the pressure in each reactor is preferably less than about 6,000 psi (about 42,000 kiloPascals or kPa), most preferably from about 1,500 psi to 3,000 psi (about 14,000–22,000 kPa)

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc— the so-called very low density polyethylene and ultra low density polyethylenes (or "plastomers").

Generally the alpha olefin may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996).

The residence time in each reactor will depend on the design and the capacity of the reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor. In a highly preferred embodiment, the first polymerization reactor has a smaller volume than the second polymerization reactor. On leaving the reactor system the solvent is removed and the resulting polymer is finished in a conventional manner.

Further details of the invention are illustrated in the following, non limiting, examples.

EXAMPLES

Continuous Solution Polymerization

All the polymerization experiments described below were conducted using a continuous solution polymerization system. The process is continuous in all feed streams (solvent, monomers and catalyst) and in the removal of product. All feed streams were purified prior to the reactors by contact with various absorption media to remove catalyst killing impurities such as water, oxygen and polar materials as is known to those skilled in the art. All components were stored and manipulated under an atmosphere of purified nitrogen.

The polymerization system included two reactors connected in series. The first reactor had an internal volume of 51 mL and was connected via tubing to a second reactor having an internal volume of 71.5 mL. It was possible to add monomers, solvent and/or catalysts to each of the reactors.

The catalyst used in the first reactor was a titanium complex having one cyclopentadienyl ligand, one tri (tertiary butyl) phosphinimine ligand and two chloride ligands (i.e. "CpTi NP($^t$Bu)$_3$ Cl$_2$"). This catalyst was used in all inventive experiments and is identified in Table 1 as "PIC" (for phosphinimine catalyst).

The Ziegler Natta catalyst used in the second reactor was a mixed titanium/vanadium system using titanium tetrachloride ("TiCl$_4$") and vanadium oxy trichloride ("VOCl$_3$"). Triethyl aluminum ("AlEt$_3$") was used as part of the Ziegler Natta catalyst system.

The cocatalyst used in the first reactor was a combination of a boron-containing ionic activator and an alumoxane. (Note: the ionic activator used in experiments 1,2,3,4,5 and 6 was triphenylmethylium tetrakispentafluorophenyl borate or "Ph$_3$CB(C$_6$F$_5$)$_4$". The ionic activator used in the remaining experiments was trispentafluorophenyl borane or "B(C$_6$F$_5$)$_3$". The alumoxane used in all other experiments was a commercially available isobutylaluminoxane sold under the trademark "IBAO-65" by AKZO-Nobel).

Catalysts and cocatalysts used in the first reactor were added independently by way of xylene solutions.

The polymerizations were carried out in cyclohexane at a pressure of about 1,500 pounds per square inch gauge ("psi"). The pressure in the second reactor was slightly lower than that of the first to facilitate transfer of the polymer solution between the reactors. Ethylene was supplied to the reactors by a calibrated thermal mass flow meter and was dissolved in the reaction solvent prior to the polymerization reactor. If comonomer was used it was also premixed with the ethylene before entering the polymerization reactor. Under these conditions the ethylene conversion is a dependent variable controlled by such variables as the catalyst concentration, reaction temperature and catalyst activity.

The internal reactor temperatures were monitored by a thermocouple in the polymerization medium and can be controlled at the required set point to +/-0.50° C. Downstream of the second reactor the pressure was reduced from the reaction pressure (about 1,500 psi) to atmospheric pressure. The solid polymer was then recovered from the discharge of the second reactor as a slurry in the condensed solvent and was dried by evaporation before analysis.

The accompanying tables illustrate flow rates to the reactors, catalyst concentrations and ethylene conversions. The flow rate of ethylene ("C2" in the tables) and octene ("C8" in the tables) is expressed in grams per minute. The monomers were dissolved in solvent and flow rates were adjusted to provide average reactor residence times (also referred to as "hold up times" or "HUT") of 1.5 minutes in the first reactor and 1.74 minutes in the second reactor (for all experiments). The concentration of catalyst in each reactor is reported on a transition metal basis. Likewise, the mole ratio of cocatalysts (in comparison to the catalysts) is reported for all experiments in the tables.

The ethylene conversions ("Q", in the tables) in each reactor were determined by gas chromatography. The results are shown in the tables under the heading "%Q-R1" and "%Q-R2" for the first and second reactor, respectively.

The experiments of Table 1 were completed using Ph$_3$CB (C$_6$F$_5$)$_4$ as the ionic activator at reactor temperatures of 160° C. in the first reactor and 230° C. in the second reactor.

Table 2 illustrates the effect of using a different ionic activator, namely B(C$_6$F$_5$)$_3$. The reactor temperatures were again 160° C. for the first reactor and 230° C. for the second reactor.

Table 3 illustrates the effect of using different first reactor temperatures while keeping the second reactor temperature at 230° C. Experiments 1, 2, 4, 5, 7 and 9 are comparative and are provided to illustrate comparative products produced using single reactor/single catalyst systems.

Polymer Analysis

Molecular weights were determined by gel permeation chromatography ("GPC"). GPC analysis was carried out using a Waters 150C GPC using 1,2,4-trichlorobenzene as the mobile phase at 140° C. The samples were prepared by dissolving the polymer in the mobile phase solvent in an external oven at 0.1% (w/v) and were run without filtration. Molecular weights are expressed as polyethylene equivalents with a relative standard deviation of 2.9% and 5.0% for the number average molecular weight "Mn" and weight average molecular weight "Mw" respectively. Molecular weight distribution ("MWD") is obtained by dividing Mw by Mn.

Melt index (MI) measurements were conducted according to ASTM method D-1238-82.

Polymer densities were measured using pressed plaques (ASTM D-1928-90) with a densitometer.

The amount of comonomer was determined by Fourier transform infra red ("FTIR") analysis and reported in the tables.

TABLE 1

Dual Reactor, Phosphinimine catalyst to first (cold) reactor and Ziegler-Natta catalyst to the second (hot) reactor
(using trityl borate activator with the single site catalyst)

| | First Reactor PIC/Ph$_3$CB(C$_6$F$_5$)$_4$/IBAO.65 (1/1.2/100 mole ratio) | | | | Second Reactor Ziegler-Natta Catalyst (Ti/V - 20/80M) - AlEt$_3$ | | | | | Polymer Characterization | | | | | |
|---|---|---|---|---|---|---|---|---|---|---|---|---|---|---|---|
| Run # | C2 g/min | C8 g/min | [Ti] µmol/L | % Q-R1 | C2 g/min | C8 g/min | Al/(Ti&V) Molar | [Ti&V] µmol/L | % Q-R2 | MI | Density g/cc | Mn x 1000 | Mw x 1000 | MWD | Wt. % C8 (FTIR) |
| 1 | 2.7 | 0 | 0.38 | 90.3 | — | — | — | — | — | — | 0.9477 | 76.8 | 201.5 | 2.62 | — |
| 2 | — | — | — | — | 2.7 | 0 | 2.0 | 780 | 89.75 | 3.76 | 0.9688 | 14.4 | 81.1 | 5.63 | — |
| 3 | 2.7 | 0 | 0.38 | — | 2.7 | 0 | 2.0 | 780 | 96.09 | 0.27 | 0.9587 | 28.2 | 126.9 | 4.5 | — |

TABLE 1-continued

Dual Reactor, Phosphinimine catalyst to first (cold) reactor and Ziegler-Natta catalyst to the second (hot) reactor
(using trityl borate activator with the single site catalyst)

| | First Reactor PIC/Ph$_3$CB(C$_6$F$_5$)$_4$/IBAO.65 (1/1.2/100 mole ratio) | | | | Second Reactor Ziegler-Natta Catalyst (Ti/V - 20/80M) - AlEt$_3$ | | | | | Polymer Characterization | | | | | |
|---|---|---|---|---|---|---|---|---|---|---|---|---|---|---|---|
| Run # | C2 g/min | C8 g/min | [Ti] µmol/L | % Q-R1 | C2 g/min | C8 g/min | Al/(Ti&V) Molar | [Ti&V] µmol/L | % Q-R2 | MI | Density g/cc | Mn × 1000 | Mw × 1000 | MWD | Wt. % C8 (FTIR) |

Ethylene/1-Octene copolymerization

| 4 | 2.7 | 2.14 | 0.38 | — | 0 | 0 | 0 | 0 | 93.14 | 1.31 | 0.9227 | 44.4 | 87.8 | 1.98 | 7.8 |
| 5 | 0 | 2.14 | 0 | — | 2.7 | 0.43 | 2.0 | 976 | 89.85 | 48.46 | 0.9380 | 6.44 | 37.8 | 5.87 | 11.5 |
| 6 | 2.7 | 2.14 | 0.38 | — | 2.7 | 0.43 | 2.0 | 976 | 96.56 | 6.91 | 0.9280 | 2.95 | 63.2 | 21.42 | 14 |

TABLE 2

Dual Reactor, Phosphinimine catalyst to first (cold) reactor and Ziegler-Natta catalyst to the second (hot) reactor
(using tris-borane activator with the single site catalyst)

| | First Reactor PIC/B(C$_6$F$_5$)$_3$/IBAO-65 (1.0/4.0/50 mole ratio) | | | | Second Reactor Ziegler-Natta Catalyst (Ti/V - 20/80M) - AlEt$_3$ | | | | | Polymer Characterization | | | | | |
|---|---|---|---|---|---|---|---|---|---|---|---|---|---|---|---|
| Run # | C2 g/min | C8 g/min | [Ti] µmol/L | % Q-R1 | C2 g/min | C8 g/min | Al/(Ti&V) Molar | [Ti&V] µmol/L | % Q-R2 | MI | Density g/cc | Mn × 1000 | Mw × 1000 | MWD | Wt. % C8 (FTIR) |
| 7 | 2.7 | 0 | 1.18 | 86.02 | 0 | 0 | 0 | 0 | — | — | 0.9433 | 133.0 | 234.8 | 1.77 | — |
| 8 | 2.7 | 0 | 1.18 | — | 2.7 | 0 | 2.0 | 780 | 95.68 | 0.08 | 0.9575 | 25.4 | 174.9 | 6.89 | — |

Ethylene/1-Octene copolymerization

| 9 | 2.7 | 2.14 | 1.18 | 86.22 | 0 | 0 | 0 | 0 | — | 0.73 | 0.9212 | 58.1 | 98.5 | 1.70 | 7.3 |
| 10 | 2.7 | 2.14 | 1.18 | — | 2.7 | 0.43 | 2.0 | 976 | 97.04 | 6.20 | 0.9289 | 7.65 | 73.4 | 9.59 | 9.3 |

TABLE 3

Dual Reactor, Phosphinimine catalyst to first (cold) reactor and Ziegler-Natta catalyst to the second (hot) reactor
Effect of first reactor temperature variation.

| | First Reactor PIC/B(C$_6$F$_5$)$_3$/IBAO-65 (1.0/4.0/50 mole ratio) | | | | Second Reactor Ziegler-Natta Catalyst (Ti/V - 20/80M) - AlEt$_3$ | | | | | Polymer Characterization | | | | | |
|---|---|---|---|---|---|---|---|---|---|---|---|---|---|---|---|
| Run # | C2 g/min | C8 g/min | [Ti] µmol/L | Temp (R1) | C2 g/min | C8 g/min | Al/(Ti&V) Molar | [Ti&V] µmol/L | % Q-R2 | MI | Density g/cc | Mn × 1000 | Mw × 1000 | MWD | Wt. % C8 (FTIR) |
| 10 | 2.7 | 2.14 | 1.18 | 160 | 2.7 | 0.43 | 2.0 | 976 | 97.04 | 6.2 | 0.9289 | 7.65 | 73.4 | 9.59 | 9.3 |
| 11 | 2.2 | 2.14 | 1.18 | 150 | 2.7 | 0.43 | 2.0 | 976 | 95.86 | 5.2 | 0.9232 | 7.97 | 66.2 | 8.31 | 10.6 |
| 12 | 2.2 | 2.14 | 1.18 | 140 | 2.7 | 0.43 | 2.0 | 976 | 95.63 | 4.4 | 0.9196 | 16 | 71.8 | 4.49 | 11.2 |

What is claimed is:

1. A medium pressure solution polymerization process comprising:
    A) polymerizing ethylene, optionally with one or more $C_{3-12}$ alpha olefins, in solvent in a first polymerization reactor at a temperature of from 80 to 200° C. and a pressure of from 500 to 8,000 psi in the presence of (a) a first catalyst which is an organometallic complex of a group 4 or 5 metal that is characterized by having at least one phosphinimine ligand; and (b) a first cocatalyst; and
    B) passing said first polymer solution into a second polymerization reactor and polymerizing ethylene, optionally with one or more $C_{3-12}$ alpha olefins, in said second stirred polymerization reactor at a higher polymerization temperature than that of said first reactor in the presence of a Ziegler Natta catalyst, wherein said Ziegler Natta catalyst comprises, 1) a transition metal compound of a transition metal selected from the group consisting of groups 3, 4 or 5 transition metals and, 2) an organoaluminum component which is defined by the formula:

$$Al(X')_a(OR)_b(R)_c$$

wherein: X' is a halide; OR is an alkoxy or aryloxy group; R is a hydrocarbyl; and a, b, or c are each 0, 1, 2 or 3 with the provisos that a+b+c=3 and b+c≧1.

2. The process of claim 1 wherein said first catalyst is defined by the formula:

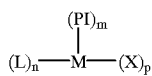

wherein: (a) M is a metal selected from the group consisting of Ti, Hf and Zr; (b) Pl is a phosphinimine ligand defined by the formula;

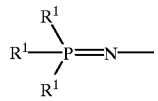

wherein each R' is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

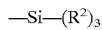

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; (c) L is a ligand selected from the group consisting of cyclopentadienyl, substituted cyclopentadienyl, indenyl, substituted indenyl, fluorenyl or substituted fluorenyl; and (d) X is an activatable ligand, and wherein: m is 1 or 2, n is 0 or 1, with the proviso that n is 1 when m is 1 and p is fixed by the valence of said metal M.

3. The process of claim 2 wherein said first catalyst is defined such that said m is one and Pl is a trialkyl phosphinimine;

n is one and L is selected from the group consisting of unsubstituted cyclopentadienyl, substituted cyclopentadienyl, unsubstituted indenyl and substituted indenyl; and p is 2 and each X is independently selected from the group consisting of (a) an alkyl having from one to ten carbon atoms; and (b) a halide.

4. The process according to claim 3 wherein said first catalyst is cyclopentadienyl titanium (tri(tertiary butyl) phosphinimine) dichloride.

5. The process according to claim 2 wherein said metal is titanium and wherein the concentration of said titanium in said first reactor is less that one part per million.

6. The process of claim 5 wherein said first cocatalyst contains an alumoxane with the further proviso that the Al/Ti mole ratio, based upon aluminum in said alumoxane and titanium in said first catalyst is from 10/1 to 200/1.

7. The process of claim 6 wherein said first cocatalyst further includes an ionic boron cocatalyst, with the proviso that the B/Ti mole ratio, based on boron contained in said ionic cocatalyst and titanium contained in said first catalyst is from 0.5/1 to 1.5/1.

* * * * *